(12) United States Patent
Allen

(10) Patent No.: US 6,507,163 B1
(45) Date of Patent: Jan. 14, 2003

(54) ROBOTIC BRIDGE MAINTENANCE SYSTEM

(76) Inventor: Mark A. Allen, 1751 W. Berwyn Ave., Chicago, IL (US) 60640

( * ) Notice: Subject to any disclaimer, the term of this patent is extended or adjusted under 35 U.S.C. 154(b) by 0 days.

(21) Appl. No.: 08/169,383

(22) Filed: Dec. 20, 1993

(51) Int. Cl.$^7$ .......................... G05B 11/01; G05B 23/02; E01D 1/00; A47L 7/00

(52) U.S. Cl. .................. 318/560; 318/565; 318/568.12; 318/568.25; 318/628; 318/649; 14/78; 15/300.1; 15/321; 15/340.1; 15/346; 901/34; 901/43; 901/47

(58) Field of Search ................. 14/771.1, 78; 15/300.1, 15/321, 327.5, 330, 340.1, 345, 346, 298; 29/DIG. 7, 78; 114/222; 118/713, 75, 504; 182/2, 36–39, 129, 141–149; 318/560, 565, 568.11, 568.12, 568.17, 568.18, 568.21, 568.25, 628, 640, 649; 314/146, 188, 190, 424.07; 395/94–96; 901/9, 29, 34, 43, 47

(56) References Cited

U.S. PATENT DOCUMENTS

| | | |
|---|---|---|
| 4,000,819 A | 1/1977 | Germond et al. |
| 4,154,318 A * | 5/1979 | Malleone ..................... 182/12 |
| 4,239,431 A | 12/1980 | Davini ........................... 414/1 |
| 4,283,764 A | 8/1981 | Crum et al. ................. 318/628 |
| 4,568,311 A | 2/1986 | Miyake ................... 414/378 X |
| 4,727,471 A | 2/1988 | Driels et al. ................. 384/167 |
| 4,744,719 A | 5/1988 | Asano et al. ................ 414/730 |
| 4,821,673 A | 4/1989 | Kirigakubo et al. ........ 118/319 |
| 4,828,451 A | 5/1989 | Mikoshi et al. ............. 414/680 |
| 4,852,307 A * | 8/1989 | Goateau ....................... 51/319 |
| 4,864,966 A | 9/1989 | Anderson et al. ........... 118/668 |
| 4,969,108 A | 11/1990 | Webb et al. ................. 364/513 |
| 4,993,913 A | 2/1991 | Ohtsuki ....................... 414/729 |
| 5,015,489 A | 5/1991 | Yoda ........................... 74/479 |
| 5,046,022 A * | 9/1991 | Conway et al. ............. 364/513 |
| 5,052,736 A * | 10/1991 | Loncaric et al. ............ 294/106 |
| 5,096,353 A | 3/1992 | Tesh et al. ................... 414/275 |
| 5,116,180 A * | 5/1992 | Fung et al. ..................... 414/5 |
| 5,130,625 A * | 7/1992 | Babel ......................... 318/580 |
| 5,195,388 A | 3/1993 | Zona et al. ................... 74/479 |
| 5,219,264 A | 6/1993 | McClure et al. ............ 414/730 |
| 5,239,246 A * | 8/1993 | Kim ....................... 318/568.11 |
| 5,249,479 A | 10/1993 | Torii et al. ................ 901/28 X |
| 5,266,875 A * | 11/1993 | Slotine te al. ......... 318/568.11 |
| 5,398,632 A * | 3/1995 | Goldbach et al. ........... 114/222 |

FOREIGN PATENT DOCUMENTS

GB 2171222 8/1986

\* cited by examiner

*Primary Examiner*—Brian Sircus
(74) *Attorney, Agent, or Firm*—James Creighton Wray; Meera P. Narasimhan

(57) ABSTRACT

A bridge surface preparation, maintenance and painting system has a truck-mounted man lift with an extensible platform on which robot arms and cameras are mounted. Inflatable bags isolate the area of the bridge being worked on, and an apron catches debris such as from sand blasting. An operator sits at a remote control console on a truck, directs the man lift platform into position, controls the inflating of the barriers and operates and guides the robot arms through master-slave controls while watching video displays. The machine is used for surface preparation, undercoating, finish coat painting and bridge inspections.

15 Claims, 2 Drawing Sheets

ROBOTIC BRIDGE MAINTENANCE SYSTEM

BACKGROUND OF THE INVENTION

Bridges, especially bridges over highways, require vigilant maintenance to protect their strength.

Highway maintenance trucks have been developed in which the entire bed of a truck is raised on scissor movements so that workers can access bridge beams and superstructures directly for cleaning, chipping and sand blasting, and subsequently for painting.

The bridge maintenance work is difficult, dirty, environmentally exposed and highly skilled work and is therefore accomplished at great expense. The work is especially dangerous because the work requires being physically close to speeding traffic, closing busy highway lanes and erecting appropriate warnings and barriers. Moreover, the job is extremely dangerous because contact of the support truck by fast moving traffic might result in jarring of the raised truck bed and ejecting of a person from the raised bed onto the roadway surface below.

Because of the natures of the coatings and the coating removing processes which are employed, it is necessary for workmen to wear heavy protective gear. The heavy protective gear makes working conditions extremely difficult and results in prolonged efforts required for maintenance of individual bridges.

A need exists for a system which avoids the expenses, dangers and discomforts of the prior art systems.

One process especially suited to robotics applications is bridge painting. Poor worker safety and the inefficient labor intensive procedures used in bridge painting presents an opportunity to apply robotics technology to that process in a cost effective way.

This invention improves safety and at the same time reduces the cost of bridge painting. Other designs have tried to improve productivity by providing the workers easier access to work spaces or through more efficient hand tools. However, no previous attempts to improve the process have been successful.

Superstructures of highway overpasses are the areas targeted by this invention. Those types of bridges comprise the majority of bridge structures in this country. Although those structures can vary in dimension, they maintain the same basic beam stringer type structural characteristics consisting of consecutive I-beams spanning supports. That provides a certain degree of conformity, enabling an automated containment process.

The invention includes the tools necessary to accomplish all tasks associated with stripping and repainting bridge surfaces. Viewing the work space through remote cameras located atop the robot arms and at either end of the platform, the worker controls the unit from the ground using a control panel and an interactive master-slave manipulator. That eliminates the need for workmen to ascend to the work space, thus preventing exposure to the harmful particles generated during this process and to falls due to accidents.

The system has two robot arms shielded in latex sleeves and mounted atop a platform. The platform is positioned beneath the targeted structure using a mobile hoisting system modified from a man lift. A control unit containing both the master manipulator and a control panel is affixed to the man lift, enabling the entire system to maneuver independently. Once in position, containment barriers are deployed to contain the work space, and work commences.

The entire system can be carried aboard a truck. The man lift is capable of either operating from atop the truck bed or maneuvering off the bed to locations inaccessible to the truck. Unlike conventional methods, this system disrupts only one lane of traffic when in operation.

To accomplish the goal of automating this process, a new control system is created. An existing platform system is modified to suit the application. That platform is raised into position, carrying the robot arms and their supporting gear. A vision system is employed to enable the user to view the work space adequately from a remote location. A gripper adds dexterity and flexibility to the arms. A paint removal and collection system and a new automated containment system prevents lead from escaping into the environment. A single control panel integrates the controls of each of the system's utilities.

The new control approach allows the user to feel the forces exerted by the remote arm. A master manipulator is included. In one embodiment, a controller controls three degrees of freedom. The control system may have six degrees of freedom plus a gripper.

The invention provides a integration of various systems such as a paint application system, a sand blasting system, a vision system, a gripper, a surface cleaning system, and a canvas and inflatable containment system.

A platform carries the system up to the bridge I-beams and facilitates use of the various systems.

A commercially available robot arm and controller is employed. Modifying an existing arm facilitates needs.

Preferred robot arms have eight degrees of freedom. They consist of a three-joint wrist, an elbow joint and a two-joint shoulder. That part of the arm consists of six joints and is similar to a Puma manipulator and a human arm. The human arm has a three-joint shoulder instead. Such similarities are important, since they provide good intuition when controlled by a human arm via a master manipulator. The arm is mounted on a two axis table with one horizontal axis and one vertical axis. The two linear motion degrees allow the tool to move efficiently along two linear directions and ease control of the master. The overall eight joints provide good dexterity for the robot, helping it avoid obstructions.

A master-slave control system is capable of interactive control. This configuration allows an operator to control the robot arm by simply inserting his arm into a sleeve. Then whatever movement the operator executes with his arm is duplicated by the remote robot arm. However, unlike conventional master-slave manipulators, the invention provides the user with the ability to feel the actions of the remote arm in real time through a controller force feedback system.

In a new force control approach, the axes on the master manipulator are equipped with encoder motors. When the user begins to move his arm, the master manipulator sends pulses from the encoders to the controller. The pulses are used as desired positions to implement a proportional derivative control algorithm in the controller. The controller then generates a current for the motors on the slave robot based on that algorithm to bring the slave robot arm back into synchronous motion with the master controller.

A fraction of the current generated for each of the slave robot arms axes is diverted to the corresponding joint motors of the master manipulator by way of a current divider. The resultant motor torque opposes the motion of the master manipulator. That opposition is felt by the operator. Since current is proportional to torque, the operator feels a proportional torque representative of the forces applied on the remote arm.

The result of this control capability is that it gives the operator the ability to apply precise forces to objects within the arm's environment. That is accomplished by using a human in the control loop. The implemented position and force control is then greatly simplified by the elimination of complex position and force control algorithms, force sensors, and interfacing microprocessors common to other force feedback systems.

Once the arm is in contact with an object, the user can increase the forces applied by continuing to move the master in the object's direction. That results in an increase in the difference between desired and actual positions, causing the controller to increase current to both the master and slave motors.

The current divider also simplifies the system by allowing use of an off-the-shelf controller with only minor modifications and no additional axes capabilities. All of these simplifications help reduce development time and cost.

This system prevents the user from inadvertently damaging the robot arm by limiting the motor currents. That is accomplished by adjusting the opposing currents in the master manipulator, enabling it to physically prevent the user from exceeding predetermined limits.

In one embodiment, the invention is accomplished using a Universal Master Controller with a Puma Mark 2 robot arm.

The Universal Master Controller allows programming a control algorithm with the ability to control 16 axes simultaneously. The finished system uses the current divider to provide current to the master manipulator motors. The extra axes available on the controller are used for redundant checks. That enables varying of parameters, allowing determination of design requirements for the current divider.

Because of the high cost of the Universal Master Controller and the Puma arm, other embodiments use economical types of controller systems and robot arms.

A platform is used for carrying the arm and its supporting gear up to the bridge structure. The platform also initially lifts setup workmen and their gear to the work space.

This platform performs several functions. First, it is capable of positioning the arms beneath the work space. Second, the platform collects and recycles the abrasives used to remove the old coatings, as well as other debris generated during other processes. Third, the platform contains a vision system that enables the user to adequately view the work space. Fourth, the platform contains the area being worked on to prevent fine chips of the lead paint being removed and aerosols of the paint being applied from escaping into the environment.

The platform is raised into position using a man lift. That type of lift is mobile, has a vertical ceiling of 65 feet, and extends horizontally, allowing the system to access remote areas. The robot arms are capable of moving back and forth across the top of the platform to better access the work space. That is accomplished using two independent linear motion systems, one for each arm.

To compensate for the different angles the man lift uses to reach the work space, the platform repositions itself parallel to and level with the targeted I-beams. That requires a positioning system attached to the end of the man lift capable of rotating and repositioning in the x-z and y-z planes. That is accomplished using a three degree of freedom gearing system between the platform base and the man lift.

A collection and filtration system significantly smaller than ones used in the large containment areas is used for filtering the air and for recycling the aggregate for reuse in the paint removal process. That also aids the containment effort by providing a negative pressure in the contained work space.

Two stationary cameras are mounted on adjacent ends of the platform to allow the user to view the entire arm. That enables the operator to see the general position of the arm and aids in avoiding obstructions. Cameras also ride atop each arm, enabling the user to view the areas being worked on.

A barrier containment system is provided. Once in position, the platform contains the work space to prevent lead paint and other particles from escaping into the environment. That is accomplished in part by deploying either inflatable panels or a combination of inflatable and canvas barriers to seal off the areas.

By using a collection and filtration system, a vacuum is created in the containment area. The system filters air extracted from the work area and expels clean air back into the environment. The creation of a vacuum in the work space prevents dust particles from escaping through small gaps that may exist around the barrier periphery. A separate high velocity fan allows for a large air flow through the contained area, while preventing particles from escaping.

The barrier system is remotely positioned and deployed. Inflatable panels conform to the many different dimensions encountered when working on the bridge structures. An assortment of differently dimensioned barriers facilitates meeting requirements imposed by different dimensions and spacing of the targeted I-beams. That is similar to blowing up a rectangular shaped raft inside a rectangular containment space.

When working between I-beams, the ends of the work space are contained. The gaps between the base and the bottom sides of the I-beams are filled. For the ends, inflated rectangular barriers are movable to adjust the length of the contained area, enabling adaptability while avoiding obstructions. The sides are sealed by using inflatable cylinders and positioning them against the side opposite the contained area. That approach allows access to the underside of the I-beams.

The exterior sides of the bridges, the facia, also have to be contained. That involves containing the top and one side of the work space as well as the ends. The ends of that work space are contained using the same inflatable barriers used between the I-beams. The top and one side are contained using either an adjustable canvas system or another inflatable barrier system.

A preferred bridge surface preparation, maintenance and painting system has a truck-mounted man lift with an extensible platform on which robot arms and cameras are mounted. Inflatable bags isolate the area of the bridge being worked on, and an apron catches debris such as from sand blasting. An operator sits at a remote control console on a truck, directs the man lift platform into position, controls the inflating of the barriers and operates and guides the robot arms through master-slave controls while watching video displays. The machine is used for both surface preparation and undercoat and finish coat painting, as well as for preliminary, final and periodic inspections.

A robotic bridge maintenance system has a lift arm with a proximal end for supporting on a truck and a distal end. A platform is mounted on the distal end of the support arm for positioning adjacent bridge girders. Robots have bases mounted on the platform and extensible arms, and have working heads at distal ends of the robot arms. Bases move along the platform. Television cameras are mounted on the robots and on the platform. An inflatable bag is mounted on the platform for contacting a bridge beam and partially surrounding the television cameras and the robots. An apron is connected to the platform and extends around the platform for catching debris. A control console mounted on a truck has television displays connected to the television cameras, and has master-slave manipulators connected to the robots for directing the robots.

These and further and other objects and features of the invention are apparent in the disclosure, which includes the above and ongoing written specification, with the claims and the drawings.

DETAILED DESCRIPTION OF THE DRAWINGS

The drawings depict what the final product might look like in operation. The drawings show the new painting system accessing the facia of an overpass. Differences between the invention and the drawings should be pointed out. The barrier system is omitted for clarity in FIG. 1. The control unit attached to the man lift and the collection system are also omitted.

Figure 1:
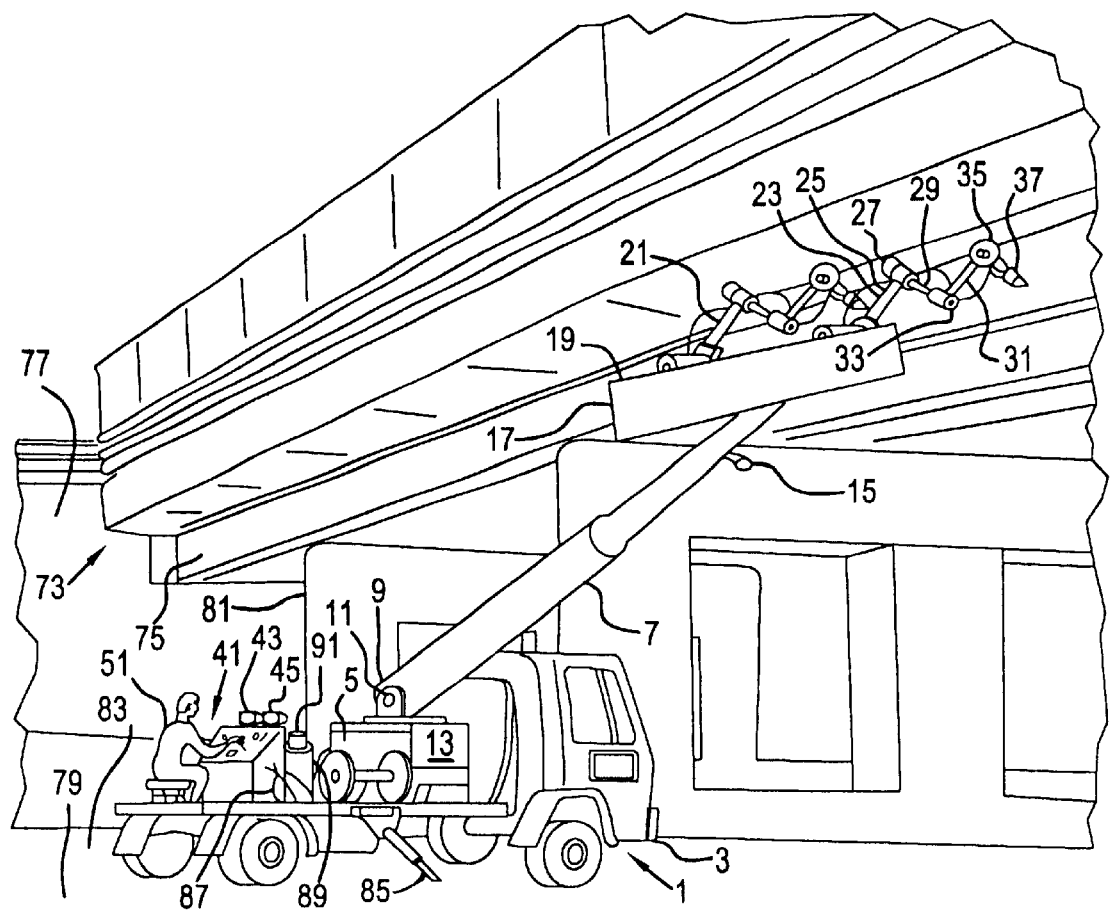
FIG. 1 is a perspective view schematically showing the system of the present invention in operation.

Referring to FIG. 1, the bridge maintenance robot system is generally indicated by the numeral 1. The system includes a highway truck 3 and a man lift 5 which is mounted on a truck. The man lift has a support boom 7 with a proximal end 9 mounted on a trunnion 11 connected to the body 13 of the man lift 5. A distal end 15 of the telescoping support boom 7 is connected to a platform 17 with an upper surface 19 which supports one, two or more robots 21 and 23. Each robot has a base, a body 25, shoulder 27, arms 29 and 31, an elbow 33 and a wrist 35 which hold the gripper 37, camera and tools. Additional cameras are mounted on the platform 17.

Figure 2:
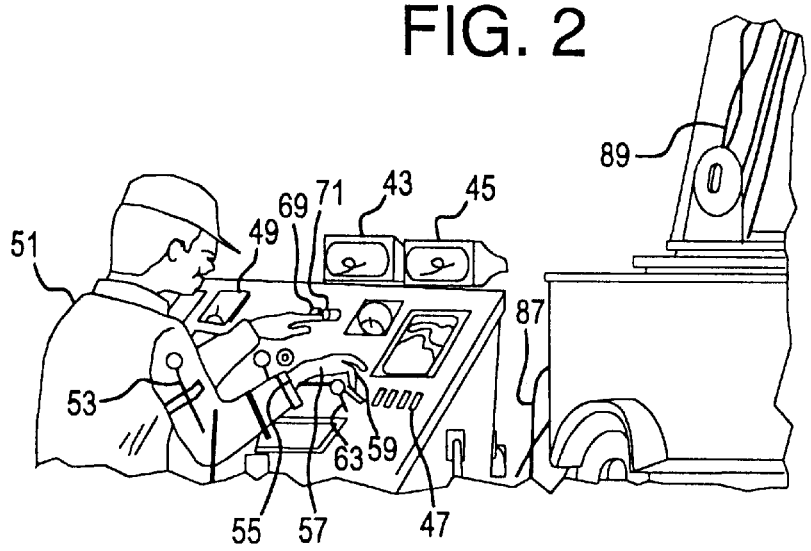
FIG. 2 is a schematic perspective view of the operator's console.

The control console, as shown in FIGS. 1 and 2, has a control board 41 with television displays 43 and 45 mounted on a direct line of sight for the operator. Power switches 47 control power to the system, and indicators 49 provide indications of operating conditions and application conditions.

An operator 51 positions his arm 53 in a series of master control elements 55. By moving his arm and hand 57 and fingers 59, the operator manipulates control elements 61, 63, 65 and 67 to control exact movements of elements of the right hand slave robot 21. Similar controls are used for the left hand robot by the operator's control with his left arm and hand. In addition, the blasting medium is controlled by switch 69, and the coating medium is controlled by switch 71.

As shown in FIG. 1, the bridge has a horizontal span 73 which is supported on beams 75, which extend from pier 77 to an opposite pier on the opposite side of a highway 79. Vertical supports 81 are located in the center of the bridge in the median area 83 of the highway. The truck 3 with its hydraulically operated struts 85 may be parked on the shoulder of the highway or on the median strip of the highway, and the boom 7 may be extended over one or more lanes of highway. A lane of highway should be blocked while operating the boom over that lane, but the entire operation is such that the bridge may be maintained without shutting off any lane of traffic by accessing the bridge laterally from the median or from the highway shoulder.

It is always preferable to park the truck 3 in the median or shoulder, even when lanes are blocked, to further isolate the truck 3 and the operator 51 from traffic.

The entire bridge maintenance operation may be provided by a single operator, including inspection by television, sand blasting, chipping, reinspection and coating, and final inspection, all by an operator seated on the truck.

Umbilical cords 87 connect the console 7 and the hydraulic drive systems in the man lift body 13. Supply lines 89 control operations of the robots on the platform 17.

Supplies are contained in drums 91 mounted on the bed of the truck and are supplied to the robots with pumps 93, which are mounted on the drums or on the bed of the truck adjacent the drums.

Figure 3:
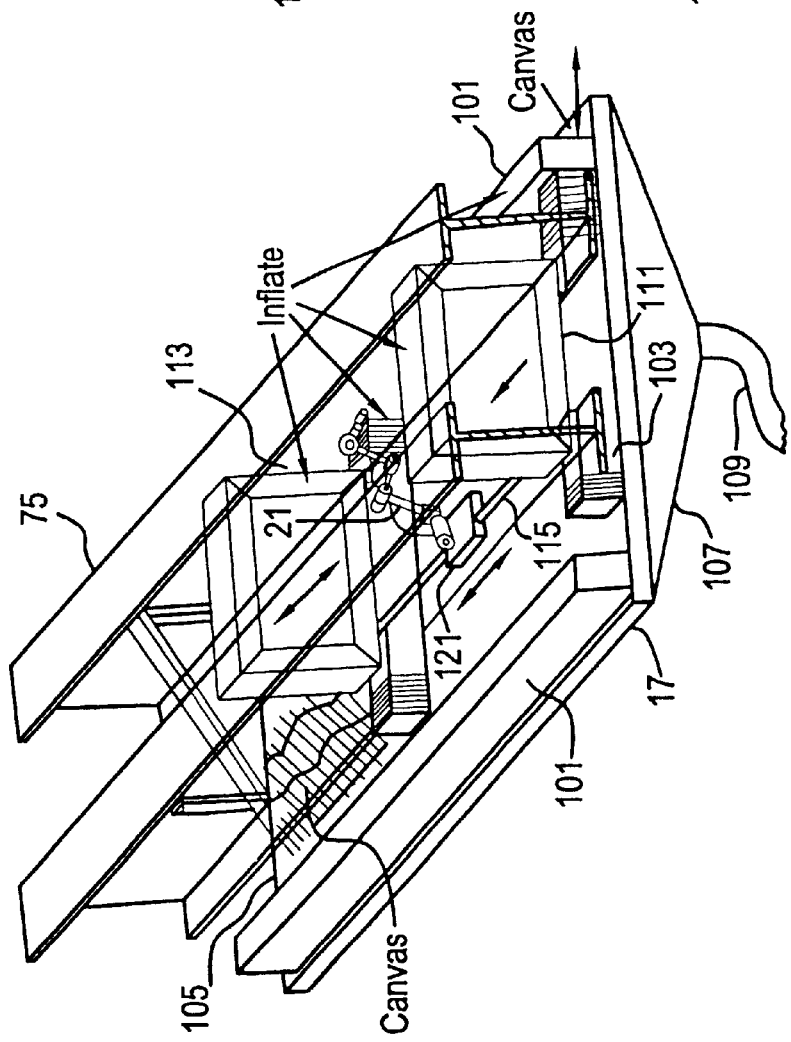
FIG. 3 is a schematic perspective view of the platform, the robot and the inflatable barriers.

As shown in FIG. 3, the platform 17 has inflatable side barriers 101 and inflatable extendable end barriers 103, which extend to or move the side barriers 101. Tent-like canvas structures 105 extend upward and inward from the side barrier to the tops of the beams to prevent unwanted egress of treatment materials such as blasting grit or paint overspray.

Debris is collected in pan 107 and returns to the truck bed through conduit 109, where the debris may be sorted, such as by magnetic or air classification sorting, for separating waste from the recyclable blast impacting and abrading medium.

Canvas bags 111 inflate between the beams near the ends of the platform 17 to isolate the working area 113 from the environment. A single slave robot 21 is shown mounted on a track 115 for movement parallel to the beams.

The track 115 may be movable laterally, or the track 115 may be fixed on the platform 17 and the platform lowered and repositioned and raised to reposition the track 115 and the path of movement of the robot 21.

By isolating the system with inflatable barriers and canvas the entire system is sealed against egress of materials, which makes the system usable over traffic lanes without parking the basic truck in the traffic lane.

As shown in FIG. 3, the lateral inflatable barriers 101 are movable laterally to the edge of the platform 17, or inwardly.

Inflatable end barriers 103 extend by accordion folds to contact the edge barriers 101 and to close the end. The inflatable barriers 103 also extend inward beneath the inflatable barriers 111, which seal ends of spaces between the main support I-beams. The canvas cover 105 extends from the inflated side barriers 101 to the main support beams.

A pan 107 collects debris and channels the debris into an evacuated conduit 109, which draws the debris toward large separators and exhaust fans.

FIG. 3 shows one robot 21 having a base 121 mounted on track 115, which is in turn fixed on the platform 17.

After the robot has been centered between the support beam 75, the barriers 111 are inflated to seal the ends of the working space between the I-beams. The edge barriers 101 are inflated, and the end barriers 103 are inflated to seal the edge barriers, and the canvas 105 is extended to the I-beams. Pressure is reduced in conduit 109, and the robot 21 begins to operate, as debris and airborne aerosols are drawn away.

Figure 4:
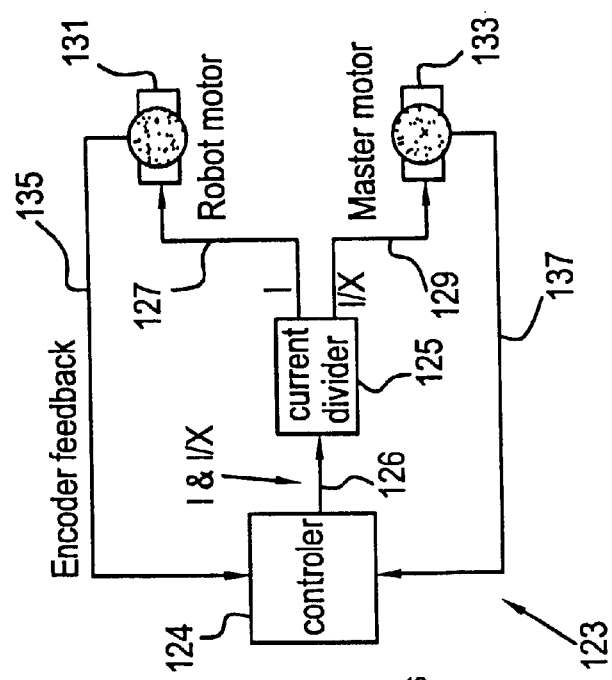
FIG. 4 is block diagram showing the workings of one axis of the system of the present invention.

Referring to FIG. 4, a schematic diagram showing the workings of one axis of the system is generally indicated by the numeral 123. A controller 124 provides a current 126 for control of the robot motor, and also provides a fraction of that current for use by the master manipulator feedback motor. A current divider 125 separates those currents into a current I 127 and a current I/X 129. The current I 127 is supplied to the robot axis motor 131, and the current I/X 129 is supplied to the master manipulator motor for that axis to provide a torque which opposes the motion of the manipulator for that axis so that the operator can feel the movement that occurs in the robot.

The operator thus senses the torque which is supplied by the master manipulator motor 133 and, by feedback from the manipulator motor, senses movement of the rotor by the robot motor 131.

The robot motor sends back a position encoder feedback 135, and the master manipulator sends back a positional encoder feedback 137, which are used by the controller 124 to provide the control output to the current divider 125. The operator conducts all of the control for maintenance of the bridge beams, and the robots provide visual feedback by the platform-mounted cameras and by the robot-mounted cameras. When the work is completed on a principal section of the bridge, the barriers are deflated, the exhaust fans are turned off, and the canvas barriers are partially rolled before the platform 17 is lowered and relocated along the bridge I-beams 75.

While the invention has been described with reference to specific embodiments, modifications and variations of the invention may be constructed without departing from the scope of the invention, which is defined in the following claims.

I claim:

1. A robotic bridge maintenance system comprises a truck a lift boom with a proximal end supported on the truck and a distal end, a platform mounted on the distal end of the support boom for positioning adjacent bridge girders, robots having bases mounted on the platform and having extensible arms and having working heads at distal ends of the robot arms, television cameras mounted on the platform, inflatable bags mounted on the platform for contacting a bridge beam and partially surrounding the television cameras and the robots, an apron connected to the platform and extending around the platform for catching debris, and a control console mounted on the truck, the control console having television monitor displays connected to the television cameras, and having master-slave manipulators connected to the robots for directing the robots.

2. The maintenance system of claim 1, wherein the inflatable bags further comprise inflatable side barriers connected to the platform and inflatable and extensible end barriers connected to the platform for movement between the side barriers, environmental containment barriers mounted opposite the robots for engaging interiors of bridge support beams for sealing work areas from ambient spaces.

3. The apparatus of claim 2, further comprising extensible canvas covers for extending between the side barriers and bridge support beams for sealing the area around bridge support beams.

4. The apparatus of claim 1, further comprising a collection pan connected to the platform and an exhaust conduit connected to the collection pan for removing debris and pollutants to a separator and an exhaust fan.

5. The apparatus of claim 1, further comprising bases on the robots, and a track connected to the platform beneath the bases for moving the robot bases along the track.

6. The maintenance system of claim 1, further comprising cameras mounted on the robots and connected to the television monitor displays on the control console.

7. The maintenance system of claim 1, further comprising master manipulator controls connected to the console and connectable to arms and hands of an operator for moving the robot in response to movement of arms and hands of the operator.

8. The system of claim 7, wherein an axis of movement on the robot is controlled by a controller and a current divider, which divides currents into a major portion and a fraction of the major portion, and a robot axis motor which moves the robot about the axis, an encoder feedback connected between the robot axis motor and the controller for sending pulses indicating movement of the robot motor to the controller, a master manipulator motor connected to the fractional output of the current divider for producing on a master manipulator control and torque which is proportional to the torque on the robot axis motor, and a positional encoder feedback connected between the master motor and the controller for movement of the master motor by the operator and indicating movement of the master motor controller.

9. A bridge maintenance system having a man lift power unit mounted on a truck bed, an extensible boom extending upward from the man lift power unit, and a platform supported on a distal end of the extensible boom for positioning beneath support beams of a bridge, a robot having a base mounted on the platform, having an arm extending from the base and a wrist at a distal end of the arm, a tool-mounting gripper connected to the wrist, and a nozzle or spray head connected to the gripper for delivering abraidents or coatings to the bridge support beams, and plural inflatable barriers and environmental containment barriers connected to the platform and extending to the support beams for preventing transmission of materials to the environment, further comprising a first camera mounted on the platform and a second camera mounted on the robot arm.

10. The apparatus of claim 9, further comprising an operator's console mounted on the truck, manipulator master controllers for engaging arms and hands of an operator mounted on the console, and television monitors mounted on the console for displaying visual information from the cameras.

11. The apparatus of claim 9, further comprising a base on the robot, and a track connected to the platform beneath the base for moving the robot platforms along the track.

12. The apparatus of claim 9, further comprising a collection pan connected to the platform and an exhaust conduit connected to the collection pan for removing debris and pollutants to a separator and an exhaust fan.

13. A bridge maintenance system having a man lift power unit mounted on a truck bed, an extensible boom extending upward from the man lift power unit, and a platform supported on a distal end of the extensible boom for positioning beneath support beams of a bridge, a robot having a base mounted on the platform, having an arm extending from the base and a wrist at a distal end of the arm, a tool-mounting gripper connected to the wrist, and a nozzle or spray head connected to the gripper for delivering abraidents or coatings to the bridge support beams, and plural inflatable barriers and environmental containment barriers connected to the platform and extending to the support beams for preventing transmission of materials to the environment, wherein the inflatable barriers further comprise inflatable side barriers connected to the platform and inflatable and extensible end barriers connected to the platform for movement between the side barriers, environmental containment barriers being mounted opposite the robots for engaging interiors of I-beams for sealing work areas from ambient spaces.

14. A bridge maintenance system having a robot on an extensible platform, wherein an axis of movement on a robot is controlled by a controller and a current divider, which divides currents into a major portion and a fraction of the major portion, and a robot axis motor which moves the robot about the axis, an encoder feedback connected between the robot axis motor and the controller for sending pulses indicating movement of the robot motor to the controller, a master manipulator motor connected to a fractional output of the current divider for producing on a master manipulator control and torque which is proportional to the torque on the robot axis motor, and a positional encoder feedback connected between the master motor and the controller for movement of the master motor by an operator and indicating movement of the master motor controller.

15. The maintenance system of claim 10, further comprising master manipulator controls connected to the console and connectable to arms and hands of an operator for moving the robot in response to movement of arms and hands of the operator.

* * * * *